(12) United States Patent
Eisenberg et al.

(10) Patent No.: US 7,310,799 B2
(45) Date of Patent: Dec. 18, 2007

(54) REDUCING LOAD INSTRUCTIONS VIA GLOBAL DATA REORDERING

(75) Inventors: Vadim Eisenberg, Haifa (IL); Maxim Gurevich, Netanya (IL); Gad Haber, Nesher (IL); Moshe Klausner, Ramat Yishai (IL)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 10/335,356

(22) Filed: Dec. 31, 2002

(65) Prior Publication Data

US 2004/0128662 A1 Jul. 1, 2004

(51) Int. Cl.
*G06F 9/45* (2006.01)
(52) U.S. Cl. .................. 717/159; 717/154
(58) Field of Classification Search .......... 717/159
See application file for complete search history.

(56) References Cited

U.S. PATENT DOCUMENTS

| | | | | |
|---|---|---|---|---|
| 5,774,722 A | * | 6/1998 | Gheith | 719/331 |
| 5,850,549 A | * | 12/1998 | Blainey et al. | 717/156 |
| 5,923,882 A | * | 7/1999 | Ho et al. | 717/147 |
| 6,360,361 B1 | * | 3/2002 | Larus et al. | 717/159 |
| 6,594,678 B1 | * | 7/2003 | Stoutamire et al. | 707/206 |
| 6,665,671 B2 | * | 12/2003 | Coutant | 707/8 |
| 6,862,729 B1 | * | 3/2005 | Kuch et al. | 717/158 |

OTHER PUBLICATIONS

Calder et al., "Cache-Conscious Data Placement," Proceedings of the Eighth International Conference on Architectural Support for Programming Languages and Operating Systems, ACM Press (Oct. 1998), pp. 139-149.*

Chow et al., "How Many Addressing Modes are Enough?," Proceedings of the Second International Conference on Architectural Support for Programming Languages and Operating Systems, IEEE Computer Society Press (Oct. 1987), pp. 117-121.*

* cited by examiner

*Primary Examiner*—Tuan Dam
*Assistant Examiner*—Michael J Yigdall

(57) ABSTRACT

A method for improving program performance including reordering a global data area of a program and for each load instruction referencing global variables within range of the immediate part of an add immediate instruction from a TOC anchor, replacing the load instruction with an add immediate instruction. The method may further include placing a TOC at the top, or within a predetermined distance from the top, of the global data area. The method may also include placing the global variables after the TOC, wherein more frequently referenced global variable are closer to the TOC than less frequently referenced global variables. Also, the method may further include placing in run-time order, groups of the global variables that frequently follow each other in run-time.

20 Claims, 3 Drawing Sheets

REDUCING LOAD INSTRUCTIONS VIA GLOBAL DATA REORDERING

FIELD OF THE INVENTION

The present invention relates to global data areas in general, and more specifically to reordering and optimization of global data areas.

BACKGROUND

Over the past several years many methods and tools have been developed to improve application performance. Many of these methods and tools are based on using data reordering/placement algorithms to improve the application's data locality.

"Cache-Conscious Data Placement", by Calder et al., the Eighth International Conference on Architectural Support for Programming Languages and Operating Systems, San Jose, Calif., 1998, and incorporated herein by reference, presents a method to improve a program's locality using data placement. Calder et al discuss the use of all data variables types: global, local (stack), and dynamic (heap) variables, as well as constants.

The data reordering of Calder et al. is based on two kinds of feedback profiles. The first profile lists each object encountered during execution, the object's name, reference count, size and lifetime information. The second profile is a temporal relationship graph (TRG) between different variables accessed by the application. The nodes of the TRG graph are variables, while an edge between two variables provides an estimation of the number of cache conflicts that would arise if these two variables were overlapped in the same cache line.

U.S. Pat. No. 5,850,549, "Global Variable Coalescing", to Blainey, et. al., assigned to the assignee of the present patent application and incorporated herein by reference, describes a weighted interference graph where each node represents a variable and each edge represents an access relationship between two variables. The weights on the edges represent the access frequency and the weights on the nodes represent the variable size.

However, these prior art data reordering optimization techniques do not go far enough; they do not realize the additional optimization opportunities revealed as a result of the data reordering. Therefore, there still exists a need to provide method and apparatus to exploit the opportunities revealed as a result of data reordering, and thus, to provide even greater application performance improvements.

SUMMARY

While prior art works have described data reordering, none of them have realized the additional optimization opportunities revealed as a result of the reordering. The present inventors have discovered that it is possible to exploit global data reordering by replacing load instructions that reference global data and constants with fast add immediate instructions. As a result, the present invention may obtain additional performance improvements.

It is therefore an objective of the present invention to realize optimization opportunities resulting from reordering program global data. Preferred embodiments of the present invention may therefore globally reorder the global data area such that a substantially maximum number of load instructions that reference global variables via a table of variable addresses, known as a Table of Contents (TOC) may be replaced with add immediate instructions.

It is an additional objective of the present invention to improve cache utilization by grouping data that is frequently referenced together in run-time. It is a further objective of the present invention to improve the data locality by reducing the size of the global data area in a given program.

According to one aspect of the present invention, there is therefore provided a method for improving program performance. The method includes reordering a global data area of a program and for each load instruction referencing global variables within range of the immediate part of an add immediate instruction from a TOC anchor, replacing the load instruction with an add immediate instruction. The method may further include placing a TOC at the top, or within a predetermined distance from the top, of the global data area.

The method may also include placing the global variables after the TOC, wherein more frequently referenced global variable are closer to the TOC than less frequently referenced global variables. Also, the method may further include placing in run-time order, groups of the global variables that frequently follow each other in run-time.

In some alternative, the method may include setting the TOC anchor to an address that will
1) enable access to all TOC entries with a load instruction using Rtoc and a displacement, and
2) a maximum number of addresses of global variables can be calculated using a single add immediate instruction.

The method may further include eliminating one or more TOC entries that contain variable addresses that are referenced by only add immediate instructions. Alternatively, it may include reordering the global data area to substantially maximize the number of load instructions replaceable with add immediate instructions.

The method may be implemented by a compiler, a linker, and/or a post-link tool.

According to one aspect of the present invention, there is therefore provided a method for improving cache utilization. The method includes reordering a global data area of a program and replacing one or more load instructions that reference global variables within range of the immediate part of the add immediate instruction from a TOC anchor, with the add immediate instruction. The method also includes eliminating one or more TOC entries that contain variable addresses that are referenced by only add immediate instructions, thereby reducing the size of the TOC. The method may be applied to improving cache ratio.

According to one aspect of the present invention, there is therefore provided a method for an improved global data area. The global data area includes a TOC within a predetermined distance from the top of the global data area, and a multiplicity of global variables after the TOC, wherein more frequently referenced global variable are closer to the TOC than less frequently referenced global variables.

The global data area may further include one or more groups of the global variables that frequently follow each other in run-time, placed in run-time order.

According to one aspect of the present invention, there is therefore provided a method for a computer program embodied on a computer-readable medium. The computer program includes a first code segment operative to place a TOC at the top, or within a predetermined distance from the top, of a global data area, and a second code segment operative to place after the TOC the multiplicity of global variables, wherein more frequently referenced global variable are closer to the TOC than less frequently referenced global variables.

The third code segment is operative to replace a load instruction with an add immediate instruction, for each load instruction referencing the global variables within a range of the immediate part of the add immediate instruction from a TOC. The fourth code segment is operative to place in run-time order, one or more groups of the global variables that frequently follow each other in run-time.

According to one aspect of the present invention, there is therefore provided a method for a computer program embodied on a computer-readable medium. The computer program includes a first code segment operative to replace one or more load instructions referencing the global variables with an add immediate instruction and a second code segment operative to eliminate one or more TOC entries that contain variable addresses that are referenced by only add immediate instructions, thereby reducing the size of the TOC.

According to one aspect of the present invention, there is therefore provided a method for a system for improving program performance. The system includes means for reordering a global data area of a program and means for replacing said load instruction with an add immediate instruction for each load instruction referencing global variables within range of the immediate part of an add immediate instruction from a TOC anchor.

According to one aspect of the present invention, there is therefore provided a method for a system for improving cache utilization. The system includes means for reordering a global data area of a program, means for replacing one or more load instructions that reference global variables within range of the immediate part of the add immediate instruction from a TOC anchor, with said add immediate instruction, and means for eliminating one or more TOC entries that contain variable addresses that are referenced by only add immediate instructions, thereby reducing the size of said TOC.

BRIEF DESCRIPTION

Embodiments of the invention will now be described, by way of example, with reference to the accompanying drawings, in which.

DETAILED DESCRIPTION

The present method may reorder the global data of a given program. The data reordering enables the replacement of frequently executed load instructions that reference global data with fast add immediate instructions, reduces the total size of global data area, and improves the global data locality.

It is noted that the present invention is especially useful in global data reordering in reduced instruction set computer (RISC) architectures. The global reordering may be according to representative feedback information of each instruction, or basic block, execution rate in the code.

For ease in understanding the present invention, herein now is a discussion of the global data mechanism in a RISC architecture.

In many RISC architectures the machine instructions are too short to contain the full absolute memory addresses as an immediate operands. Thus, unfortunately, absolute memory addresses of referenced global variables and functions must be obtained by different methods. In order to solve this problem, the affected RISC architectures typically use offsets from a base address to reference the memory addresses. The base address is typically a register. The mechanism for referencing global variables in executables is typically done via a global table, commonly known as a Table of Contents (TOC).

It is noted that references herein to global variables, although not noted, also include references to functions descriptors, constants, and any other program object that may be in global data area.

Figure 1:
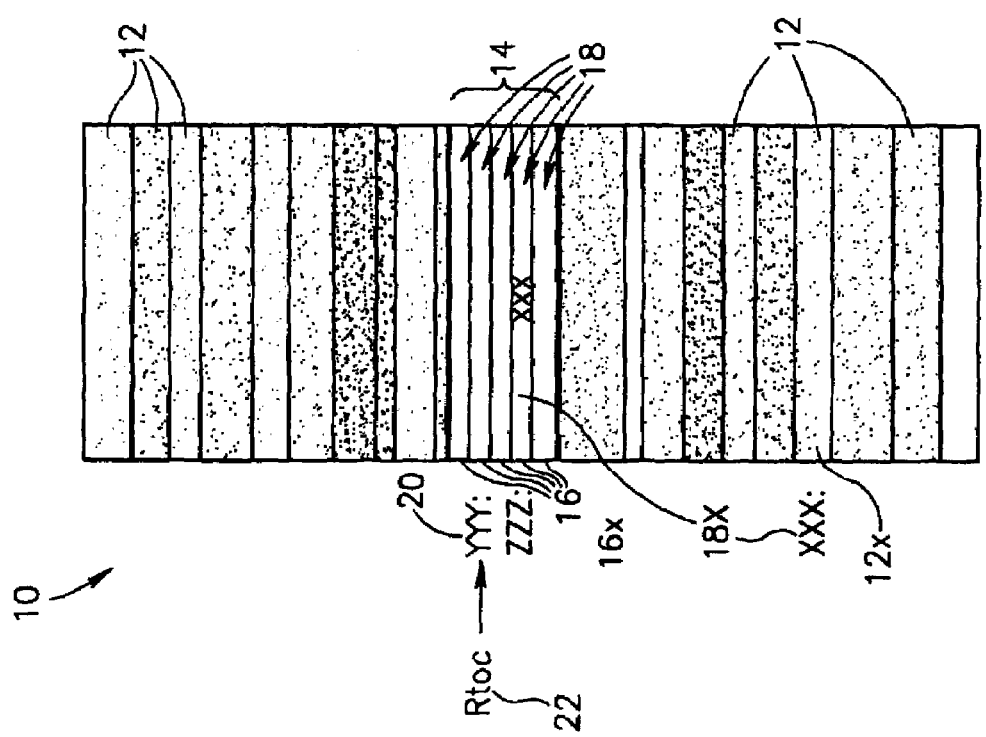
FIG. 1 is a block diagram of a global data area.

Reference is now made to FIG. 1, an illustration of a global data area 10. Global data 10 comprises global variables 12 and a TOC 14. Global variables 12 may include global variables, constants and function addresses. It is noted that in FIG. 1 global variables 12 with dense hatching are more frequently referenced by a program that those global variables 12 with lighter hatching.

TOC 14 may contain addresses of global variables 12 of the program. Thus, TOC 14 may comprise a plurality of TOC entries 16; each TOC entry 16 may contain a variable address 18. Variable addresses 18 may be the absolute address of the associated global variable 12. Consequently, when a program references a specific global variable 12, the associated variable address 18 of the referenced global variable 12 is extracted from TOC 14.

When a program accesses a TOC entry 16 in TOC 14, the program uses a special register Rtoc 22. Rtoc 22 holds an address known as TOC anchor 20. TOC anchor 20 may be the address of the middle of the TOC 14, designated in FIG. 1 as yyy.

As an example, a program may reference a global variable 12x having an address xxx. Typically, setting the address of global variable 12x into a register R5 (not shown) is done with a load instruction, using Rtoc 22 and a displacement.

The example command may then read:

load R5, Rtoc, disp or: load into R5 the content of the memory at the address that is calculated by adding Rtoc and disp.

Where load is a load instruction, disp=zzz–yyy,

Rtoc 22 holds TOC anchor 20, having a value yyy, and zzz is the address of TOC entry 16 containing the variable address 18x (xxx) of the desired global variable 12.

The inventors of the present invention discovered that by reordering the global data it is possible to replace load instructions with faster add immediate instructions. This will eliminate many of the accesses to memory, and may save considerable time. Hereinnow is a detailed explanation of global data reordering, and subsequent replacement of load instructions with add immediate instructions.

Figure 2:
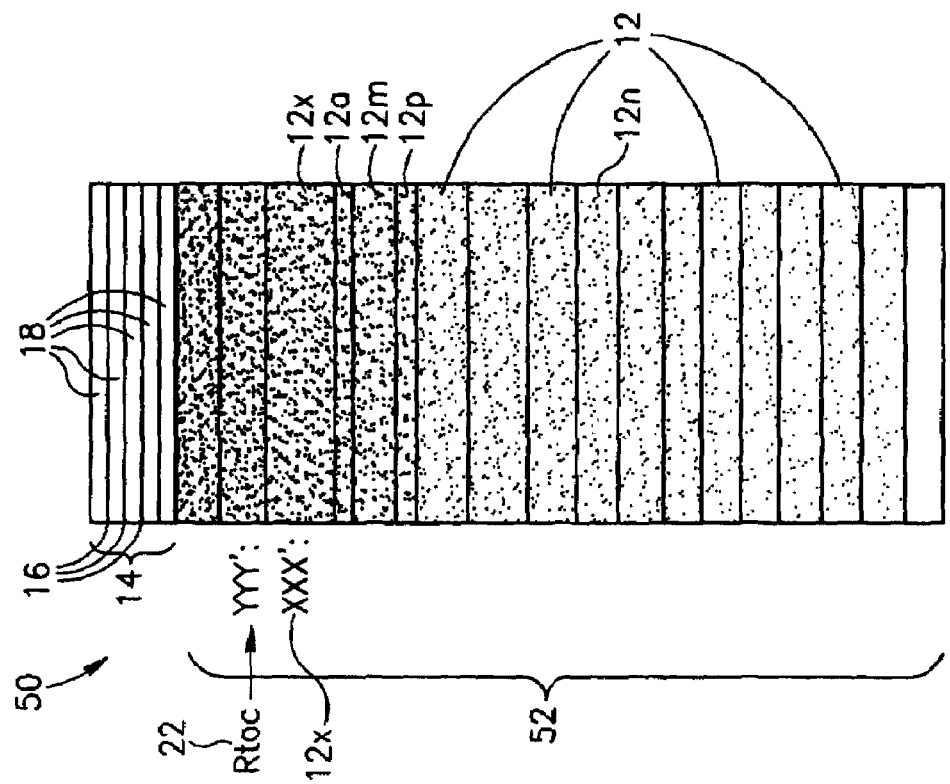
FIG. 2 is a block diagram of a global data area constructed and operated according to an embodiment of the present invention.

Reference is now made to FIG. 2, an illustration of global data area 50, operated and constructed according to a preferred embodiment of the present invention. It is noted that in preferred embodiments of the present invention TOC 14 may be relocated to the top of global data area 50. Global variables 12 may be located after TOC 14 in an area known herein as global variable area 52. The Rtoc 22 holds TOC anchor 22 having a new value yyy'.

In preferred embodiments, within global area 52, global variables 12 may be ordered generally by order of reference frequency; generally, from the most frequently referenced global variable 12, or hottest, to the least frequently referenced global variable 12, or coldest. Thus, the hottest global variable 12 may be closer to TOC 14 than colder global variables 12.

When the global variable 12 is close enough to TOC 14, it is possible to calculate the address of the variable 12 with an add immediate instruction using Rtoc 22 and an immediate value. Consequently, it may be possible to eliminate the memory access to the TOC 14, via the load instruction, by replacing the load instruction with an add immediate instruction.

Thus, returning to the above example, the address of the desired global variable 12x may be calculated by adding Rtoc 22, holding the TOC anchor 20 (yyy') and the difference (xxx'–yyy') between the TOC anchor 20 (yyy') and the address of desired global variable 12x (xxx'). Therefore, the load instruction from the above example may be replaced with an add immediate instruction as follows:

addi R5, Rtoc, imm or: add the immediate value to the address in Rtoc and put the result in R5.

Where addi is an add immediate instruction

Rtoc 22 holds TOC anchor 20 having a value yyy'; and imm=xxx'–yyy'.

In alternative embodiments of the present invention, the offset of the global variable 12 from the TOC anchor 20 may not fit into the immediate part of the add immediate instruction. In such cases the load instruction may be replaced by two or more add immediate instructions; for example add immediate and add immediate shifted in the following way:

addi R5, Rtoc, imm1 addis R5, R5, imm2 where imm1=LSB(xxx'–yyy'), representing the least significant bits (LSB) of the offset between the TOC anchor 20 (yyy') and the address xxx of the global variable 12x.

imm2=MSB(xxx'–yyy'), representing the most significant bits (MSB) of the offset between the TOC anchor 20 (yyy') and the address xxx of the global variable 12x.

Thus, in preferred embodiments of the present invention, first the immediate value imm1 may be added to Rtoc 22 and the result is put into R5. Then the immediate value imm2 may be added to R5.

Please note that the sign of the offset must be preserved.

It is additionally noted that if all the references to a specific global variable 12 are replaced with immediate references, then the associated TOC entry 16 of that specific global variable 12 may become redundant. Thus, in preferred embodiments of the present invention, redundant TOC entries 16 may be removed from TOC 14. Removal of redundant TOC entries 16 reduces the size of TOC 14, thus reducing the total size of the global data area.

For ease of understanding the following discussion, please note the following terms. $RANGE_{load}$ is the range of the displacement in the load instruction. $RANGE_{addi}$ is the range of the immediate part of the addi instruction. It is noted that $RANGE_{load}$ may be different from $RANGE_{addi}$.

A number of advantages may be realized by reducing the size of the TOC 14. One advantage is running program performance improvements. When TOC 14 is smaller, more global variables 12 may be within $RANGE_{addi}$. Please remember that each load instruction referencing a global variable 12 within $RANGE_{addi}$ may be replaced with an addi instruction. Accordingly, the more global variables 12 within $RANGE_{addi}$, the more add immediate instructions, the few the load instructions, the fewer accesses to memory to retrieve addresses of global variables 12. Hence, improved computation time.

Additionally, a smaller TOC 14 may improve the cache ratio. Typically, the cache holds the most frequently requested data. In the specific case of TOC, the cache holds the hottest TOC entries 16 and the hottest variables. If the hottest TOC entries 16 become redundant (due to the replacement of load with addi, explained above) and are removed from TOC 14, then the cache may have more room to hold variables and the remaining TOC entries 16. This will improve the cache utilization and improve performance.

It is noted that TOC entries 16 may not be removed if they are exported to other modules. This is because possibly the TOC entries 16 may be referenced from other executable modules via TOC 14.

It is further noted that the present embodiment may be implemented on a 32-bit addressing machine. However, the present invention is also applicable for 64-bit or other larger bit addressing machines. In larger bit machines several addi instructions may be used, and still be included within the true spirit and scope of the present invention.

For some architectures, two or more addi instructions may run slower than a single load instruction. Therefore, in some embodiments it is not advisable to replace frequently executed load instructions with two or more add immediate instructions.

The inventors have additionally discovered that it is desirable to maximize the performance potential of replacing load instructions with add immediate ones. In order to do so, preferred embodiments may reorder the global variables 12 such that the frequently referenced global variables 12 are located closer to the TOC 14 than less frequently referenced global variables 12.

It is appreciated that alternative embodiments may apparent to those skilled in the art, that while not being the embodiment described herein, do however place the more frequently referenced variables closer to the TOC 14 than the less frequently referenced variable. As an example, an alternative embodiment may place the most frequent referenced variable within a predefined distance from TOC 14. These alternative embodiments, while not being described herein, are readily implemented within the principles of the present invention, and are included within the true spirit and scope of the present invention.

A preferred embodiment for reordering is now explained. In preferred embodiments, in order to improve optimization of the program code, TOC anchor 20 may be relocated such that a) all TOC entries 16 are accessible with the regular load instruction using a displacement from Rtoc 22, i.e. within the range of $RANGE_{load}$, and b) a maximum number of addresses of global variables 12 can be calculated with a single add immediate instruction using the Rtoc 22 and an immediate value, i.e. they are within the range of $RANGE_{addi}$. It is noted that while the present embodiment may describe the maximum number of global variables 12 within the range of $RANGE_{addi}$, it is appreciated that alternative embodiments may apparent to those skilled in the art, which while not providing the maximum number of variable, do provide a "close to maximum" number of global variables 12 within the range of $RANGE_{addi}$. These alternative embodiments, while not being described herein, are readily implemented within the principles of the present invention, and are included within the true spirit and scope of the present invention.

In further preferred embodiments of the present invention, the TOC entries 16 are reordered in the order of the corresponding global variables.

In yet further preferred embodiments, global variables 12 may be reordered in groups of global variables 12 that are frequently referenced one-after-the-other in run-time.

Consequently, the global variables 12 most frequently referenced are reordered closer to TOC 14. Furthermore, groups of global variables 12 that frequently follow each other at run-time are placed in run-time order.

Herein in FIG. 2 is an example group of global variables 12 that frequently follow each other at run-time. Variable 12$a$ is most frequently referenced. During run-time, after reference to variable 12$a$, typically the next reference is to variable 12$m$. Also, frequently referenced after variable 12$m$, is variable 12$p$. However, variable 12$n$ is rarely referenced immediately after variable 12$a$, 12$n$ or 12$p$. Therefore, the order may be global variable 12$a$, followed by global variable 12$m$, followed by global variable 12$p$. Global variable 12$n$ may be placed separately from 12$a$, 12$n$ and 12$p$.

It is noted that after repositioning TOC 14 and global variables 12 in the global data area 50, all the remaining entries in the TOC 14 and all the instructions that reference the global data area 50 need to be modified accordingly.

Hereinnow is an example of a method for global reordering according to a preferred embodiment of the present invention.

1) Determine the hotness of global variables 12 and the groups of global variables frequently referenced together in run-time. In preferred embodiments this step may comprise creating a data connectivity graph illustrating the data usage connectivity of global data variables 12.

Figure 3A:
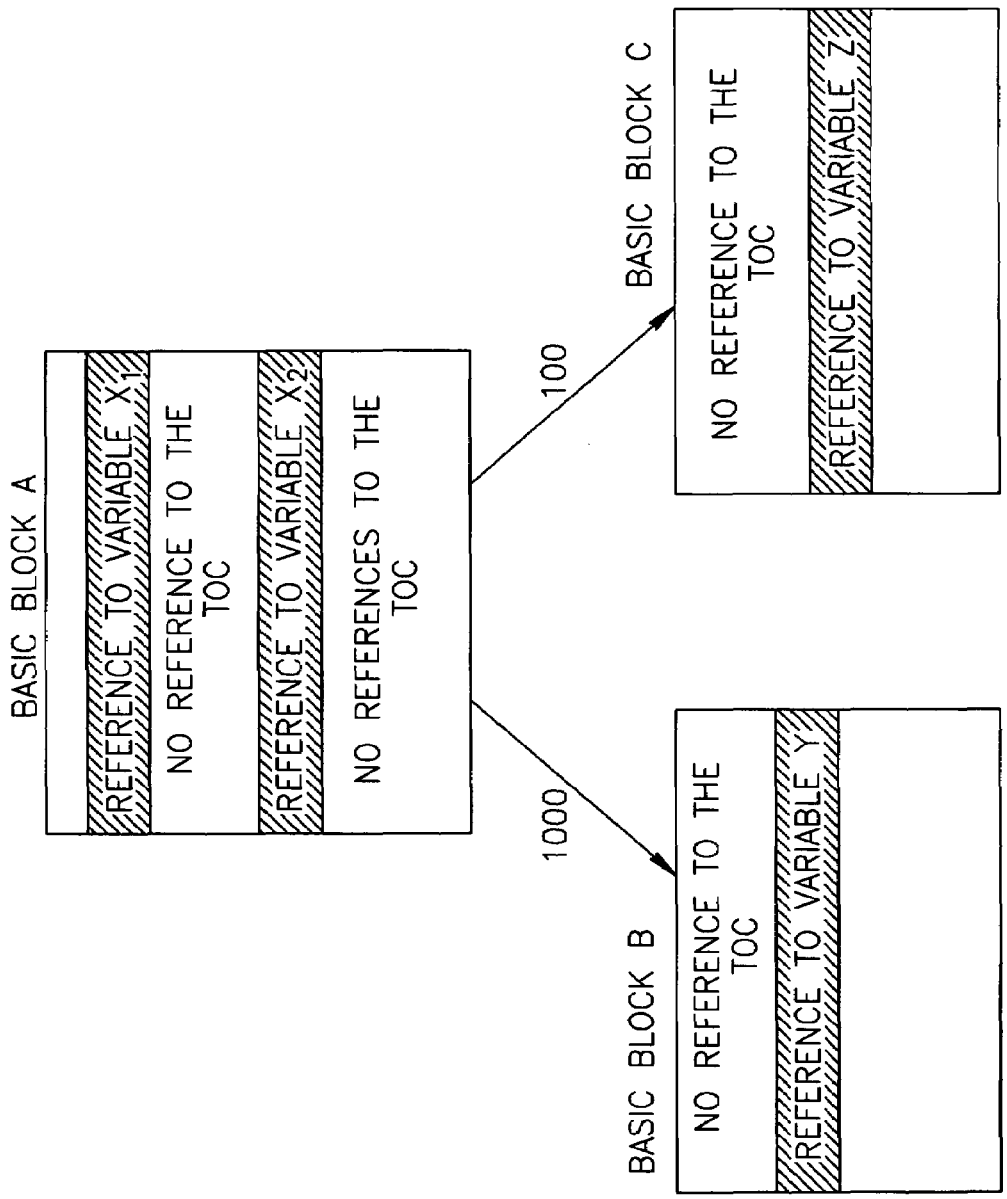
FIGS. 3A-C are examples of a data connectivity graph constructed according to a preferred embodiment of the present invention.
Figure 3B:
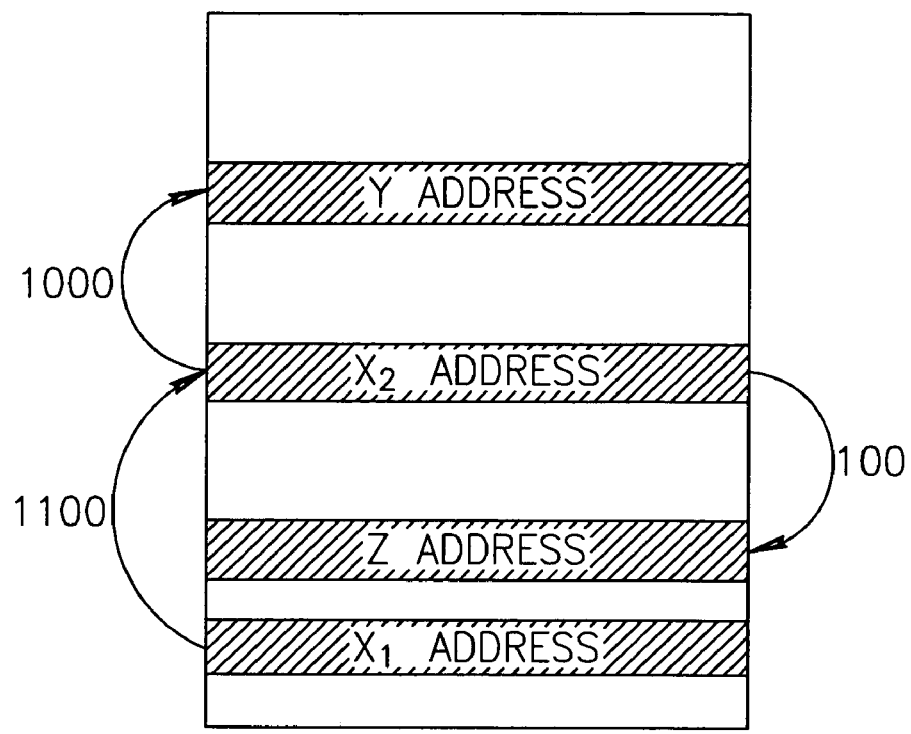
Figure 3C:
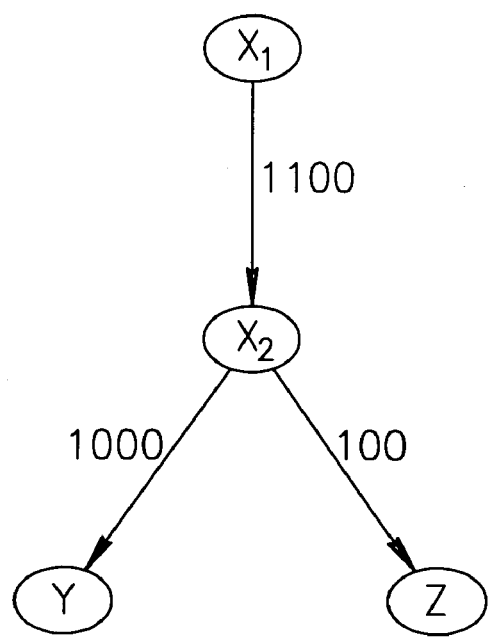

Reference is now made to FIGS. 3A-C, examples of a data connectivity graph constructed according to a preferred embodiment of the present invention. A data connectivity graph (DCG) is a weighted directed graph representing the data usage connectivity of the global data. FIG. 3A illustrates a portion of a program flow at the basic block level, including the execution rate of each instruction. FIG. 3B illustrates the data connectivity within a TOC, as drawn from the program flow and execution rates of FIG. 3A. FIG. 3C is the data connectivity graph resulting from FIG. 3B.

The illustrated DCG of FIG. 3C uses feedback information on the execution rate of each instruction, as shown in FIG. 3A. The nodes of the DCG represent the TOC entries 16 which correspond to global variables 12. Thus node $x_1$ represents TOC entry 16$x_1$ for global variable $X_1$; node z represents TOC entry 16$z$ for global variable Z.

A directed edge in the DCG represents successive references of a program to a first TOC entry 16 and a second TOC entry 16. As an example, a directed edge from a node $x_2$ to node y exists if after a reference to TOC entry 16$x_2$, the next reference of the program to the TOC 14 is to the TOC entry 16$y$. The weight of the ($x_2$,y) edge is the number of references to $x_2$ that are followed by a references to y at run time. The DCG can be constructed from the integration of the feedback information on the execution frequency of the code, together with the control flow of the program code.

In some embodiments, each node in the DCG may have a hotness measure attached to it. In general, the hotness of a global variable is set to be the sum of the execution counts of all the instructions that reference this variable address in the TOC.

In alternative embodiments, this step may comprise alternative methods of data profiling. Another example of such an alternative method is described in U.S. Pat. No. 5,850,549, described above in the Background. It is noted that the above referenced patent is just one of many methods to create a data connectivity graph. The above patent is meant by way of example only, and other methods are covered within the principles of the present invention.

2) Relocate constants. In some programs the constants may not be part of the global variable area. In such cases, the constants may be relocated and appended to the global variables area 20.

3) Relocate TOC 14. Preferably, relocate TOC 14 to the beginning of the global data area 50. Alternatively, TOC 14 may be relocated to an location close to the beginning of global data 50, while not directly at the beginning of the area.

4) Place all the global variables 12 in global variable area 52. In preferred embodiments of the present invention, global variables 12 may be reordered such that the frequently referenced global variables 12 are located closer to the TOC 14 than less frequently referenced global variables 12. In alternative embodiments, groups of global variables 12 are placed in the order in which they are most frequently referenced by the program at run-time.

In order to determine hotness and run-time order, refer to the data connectivity graph of step 1. One method for placing the global variable is described in "Cache-Conscious Data Placement", by Calder et al., noted herein above in the Background. It is noted that the "Cache-Conscious Data Placement" is just one of many placement methods. The article is meant by way of example only, and other methods are covered within the principles of the present invention.

5) Reorder TOC entries 16. The TOC entries 16 are reordered according to the order of their corresponding global variables 12.

6) Mark TOC entries 16 that can be removed. Mark as removable TOC entries 16 of non-exported variables that are never or rarely referenced by the program at run-time. It is noted that TOC entries 16 of exported variables should not be marked as removable.

7) Remove TOC entries 16 that are marked removable. Decrease the TOC size and relocate the global variables 12 accordingly.

8) Set TOC anchor 20. Set TOC anchor 20 to point to an address raddr in the global data area 50 where:

raddr=TOC$_{start}$+(RANGE$_{load}$/2)

where TOC$_{start}$ is the address of the beginning of TOC 14, and

RANGE$_{load}$ is the range of the displacement in the load instruction.

9) Update references to the global variables. Based on the restructured TOC 14, update the references to the global variables 12. A method for updating is described hereinbelow.

10) Mark removable TOC entries. Mark as removable TOC entries 16 of non-exported global variables 12 which are within the range of the RANGE$_{addi}$ from the TOC anchor 20, where RANGE$_{addi}$ is the range of the immediate part of the addi instruction.

11) If any of the remaining TOC entries 16 are marked as removable, return to step 7. Otherwise, if there are no more TOC entries 16 marked as removable, end.

It is appreciated that one or more of the steps of the above method may be omitted, or slightly modified, or carried out in a different order than shown, without departing from the true spirit and scope of the present invention.

Updating the References to the Global Data

After reducing the size of TOC 14, references to the global data area 50 may be updated to reflect the relocations. Variable addresses 18 may be updated to reflect the new locations of the associated global variables 12. In the code sections, references to the global data area 50 may be updated as follows:

1. Replace Load instructions with a single add immediate instruction. Replace Load instructions that reference TOC entries 16 of global variables 12 within RANGE$_{addi}$ from TOC anchor 20 with a single add immediate instruction, where the immediate value is the offset between the address of global variable 12 and the address of TOC anchor 20.

2. Modify the load instructions according to the new location of TOC entries 16. For the load instructions for which the TOC entry 16 was not removed, modify the load instructions that reference TOC entries 16 of global variables 12 outside the range of the RANGE$_{addi}$ from the TOC anchor 20 according to the new location of TOC entries 16

3. Replace Load instructions with two or more add immediate instruction. For the load instructions for which their TOC entry was removed, replace the load instructions that references TOC entries 16 of global variables 12 outside the range of the RANGE$_{addi}$ from TOC anchor 20 with two or more add immediate instructions as follows:

3.1. First an add immediate instruction, where the immediate value is the LSB of the offset between global variable 12 and TOC anchor 20.

3.2. Then an add immediate shifted instruction, where the immediate value is the MSB of the offset between global variable 12 and TOC anchor 20.

4. Update references to reflect the movement of the global variables 12. References to global variables 12 that were replaced with add immediate instructions are updated in order to reflect the movement of the global variables 12 relative to the TOC anchor 20 due to the reduction of TOC 14, and the resetting of the TOC anchor 20.

It is appreciated that those skilled in the art that may be aware of various other modifications, which while not specifically shown herein, are nevertheless within the true spirit and scope of the invention. As an example, load instructions may be replaced with any applicable immediate instruction that performs calculation rather than memory access, and still fall within the true spirit and scope of the invention. Likewise, any instruction that accesses the memory, may be replaced with an add immediate instruction, or any other applicable immediate instruction that performs calculation, and still falls within the true spirit and scope of the invention. Similarly, although the command examples herein are in the form of load register, base register, disp it is appreciated that other commands, such as load register, base register, index register, disp or other, still fall within the true spirit and scope of the invention.

It is appreciated that one or more of the steps of the above method may be omitted, or slightly modified, or carried out in a different order than shown, without departing from the true spirit and scope of the present invention. It is noted that the present invention may be used to modify an existing global data area or may be especially useful for creating a global data area 50. Thus the present invention may be implemented in a compiler, linker or in a post-linker, as applicable.

It will thus be appreciated that the preferred embodiments described above are cited by way of example, and that the present invention is not limited to what has been particularly shown and described herein above. Rather, the scope of the present invention includes both combinations and subcombinations of the various features described hereinabove, as well as variations and modifications thereof which would occur to person skilled in the art upon reading the foregoing description and which are not disclosed in the prior art.

The invention claimed is:

1. A method for improving program performance, the method comprising the steps of:

reordering global variables within a global data area of a program by moving global variables having addresses associated therewith in a Table of Contents (TOC) which addresses are more frequently referenced to be closer to a TOC anchor than global variables having addresses associated therewith in said TOC which addresses are less frequently referenced; and for each load instruction referencing global variables within range of the immediate part of an add immediate instruction from said TOC anchor, replacing said load instruction with an add immediate instruction.

2. The method of claim 1, further comprising the step of: placing said TOC at the top of said global data area.

3. The method of claim 1, further comprising the step of: placing said TOC within a predetermined distance from the top of said global data area.

4. The method of claim 1, further comprising the step of: placing in run-time order, groups of said global variables that frequently follow each other in run-time.

5. The method of claim 1, further comprising the step of setting said TOC anchor to an address that will enable access to all TOC entries with a load instruction using Rtoc and a displacement, and a maximum number of addresses of global variables can be calculated using a single add immediate instruction.

6. The method of claim 1, and further comprising the step of:

eliminating one or more TOC entries that contain variable addresses that are referenced by only add immediate instructions.

7. The method of claim 1, and further comprising the step of:

reordering said global data area to substantially maximize the number of load instructions replaceable with add immediate instructions.

8. The method of claim 1, wherein said claim 1 is implemented by at least one of the following; a complier, a linker, and a post-link tool.

9. A method according to claim 1 and also comprising the step of:

reordering said addresses of said global variables in said TOC by moving said addresses to correspond to said reordering of said global variables.

10. A method for improving cache utilization, the method comprising the steps of:

reordering global variables within a global data area of a program by moving global variables having addresses associated therewith in a Table of Contents (TOC) which addresses are more frequently referenced to be closer to a TOC anchor than global variables having addresses associated therewith in said TOC which addresses are less frequently referenced; and replacing one or more load instructions that reference global variables within range of the immediate part of the add immediate instruction from said TOC anchor, with said add immediate instruction; and eliminating one or more TOC entries that contain variable addresses that are referenced by only add immediate instructions, thereby reducing the size of said TOC.

11. The method of claim 10, and further comprising the steps of:
placing said TOC at the top of said global data area.

12. The method of claim 10, and further comprising the steps of:
placing said TOC within a predetermined distance from the top of said global data area.

13. The method of claim 12, and further comprising the step of
placing in run-time order, groups of said global variables that frequently follow each other in run-time.

14. The method of claim 10, and further comprising the steps of:
maximizing the number of said global variables within range of the immediate part of the add immediate instruction from said TOC anchor.

15. The method of claim 10, wherein any of said steps of reordering, replacing and eliminating are applied to improving cache ratio.

16. A computer program embodied on a computer-readable medium, the computer program comprising:
a first code segment operative to place a Table of Contents (TOC) at the top of a global data area,
a second code segment operative to place after said TOC a multiplicity of global variables, wherein global variables having addresses associated therewith in said TOC which are more frequently referenced are reordered to be closer to a TOC anchor than global variables having addresses associated therewith in said TOC which are less frequently referenced, and
a third code segment operative to replace a load instruction with an add immediate instruction, for each load instruction referencing said global variables within a range of the immediate part of the add immediate instruction from a TOC.

17. The computer program of claim 16, and further comprising:
a fourth code segment operative to place in run-time order, one or more groups of said global variables that frequently follow each other in run-time.

18. A computer program embodied on a computer-readable medium, the computer program comprising:
a first code segment operative to place a TOC within a predetermined distance from the top of a global data area, and
a second code segment operative to place after said TOC a multiplicity of global variables, wherein global variables having addresses associated therewith in said TOC which are more frequently referenced are reordered to be closer to a TOC anchor than global variables having addresses associated therewith in said TOC which are less frequently referenced, and
a third code segment operative to replace a load instruction with an add immediate instruction, for each load instruction referencing said global variables within a range of the immediate part of the add immediate instruction from a TOC.

19. A system for improving program performance, the system comprising:
means for reordering global variables within a global data area of a program, wherein global variables having addresses associated therewith in a Table of Contents (TOC) which addresses are more frequently referenced are reordered to be closer to said TOC than global variables having addresses associated therewith in said TOC which addresses are less frequently referenced; and
means for replacing a load instruction with an add immediate instruction for each load instruction referencing global variables within range of the immediate part of an add immediate instruction from a TOC anchor.

20. A system for improving cache utilization, the system comprising:
means for reordering global variables within a global data area of a program, wherein global variables having addresses associated therewith in a Table of Contents (TOC) which addresses are more frequently referenced are reordered to be closer to said TOC than global variables having addresses associated therewith in said TOC which addresses are less frequently referenced;
means for replacing one or more load instructions that reference global variables within range of the immediate part of the add immediate instruction from a TOC anchor, with said add immediate instruction, and
means for eliminating one or more TOC entries that contain variable addresses that are referenced by only add immediate instructions, thereby reducing the size of said TOC.

* * * * *